United States Patent [19]

Chen et al.

[11] E Re. 29,535

[45] Reissued Feb. 7, 1978

[54] SINGLE WALL DOMAIN NUCLEATOR

[75] Inventors: Yu-Ssu Chen, New Providence; Joseph Edward Geusic, Berkeley Heights; Terence John Nelson, New Providence; Herbert Meyer Shapiro, Bridgewater, all of N.J.

[73] Assignee: Bell Telephone Laboratories, Incorporated, Murray Hill, N.J.

[21] Appl. No.: 558,140

[22] Filed: Mar. 13, 1975

Related U.S. Patent Documents

Reissue of:

[64] Patent No.: 3,789,375
Issued: Jan. 29, 1974
Appl. No.: 303,327
Filed: Nov. 3, 1972

[51] Int. Cl.[2] ..... G11C 19/08

[52] U.S. Cl. ..... 365/11; 365/19

[58] Field of Search ..... 340/174 TF

[56] References Cited

U.S. PATENT DOCUMENTS

| | | | |
|---|---|---|---|
| 3,662,359 | 5/1972 | Genovese | 340/174 TF |
| 3,824,571 | 7/1974 | Clover et al. | 340/174 TF |

OTHER PUBLICATIONS

Bell System Technical Journal vol. 51, No. 6 July-Aug. 1972 pp. 1,427-1,430.

*Primary Examiner*—James W. Moffitt
*Attorney, Agent, or Firm*—Herbert M. Shapiro

[57] ABSTRACT

A new mechanism for bubble domain generation permits nucleation with less power than previously expected. A nucleation pulse of a particular form enables the mechanism to be employed without reducing the effective difference between the propagation and nucleation thresholds which impart stability to bubble arrangements.

16 Claims, 6 Drawing Figures

SINGLE WALL DOMAIN NUCLEATOR

Matter enclosed in heavy brackets [ ] appears in the original patent but forms no part of this reissue specification; matter printed in italics indicates the additions made by reissue.

FIELD OF THE INVENTION

This invention relates to magnetic single wall domains commonly referred to as magnetic bubbles, and particularly to arrangements for generating such bubbles in a layer of magnetic material in which they can be moved.

BACKGROUND OF THE INVENTION

It has long been understood that an advantage of magnetic bubble apparatus is the significant difference between the propagation threshold and the nucleation threshold characteristics of bubble materials. Typically, a propagation threshold is of the order of a few oersteds whereas the nucleation threshold may be of the order of thousands of oersteds. Such a difference permits high drive fields for propagation without fear of spurious domain nucleation.

But the high nucleation threshold has its penalty because high power is required to nucleate a domain. To avoid this penalty, domain generators have been devised whereby a domain is provided from an existing wall or seed domain with fields on the order of the propagation threshold.

As might be expected, there are limitations to such generators. One limitation is with respect to frequency of operation. The generators require movement of a seed domain along a path of greater length than that of a stage of the domain channel. When the propagation operation becomes mobility limited, the generator fails first thus defining the upper limit of operation. Moreover, the generator structures are typically encumbered with fail-safe arrangements, which ensure seed retention over the range of operation for which domain propagation occurs. The possibility of power failure also requires modification of the generator to ensure provision of a new seed domain should power failure occur.

BRIEF DESCRIPTION OF THE INVENTION

The present invention is based on the discovery that a domain can be generated by exceeding the nucleation threshold in only a volume of the bubble layer small compared to the volume of a bubble. Consequently, the power necessary to achieve nucleation of a domain is surprisingly low. A short duration pulse insufficient to nucleate a domain generates an unstable domain with a domain wall dividing a surface area from the bulk of the layer. A pulse of much lower amplitude but in excess of the propagation threshold moves the domain wall to the opposite surface of the layer in a direction normal to the plane of domain movement in the structure. The lower amplitude pulse exceeds the propagation threshold by an amount which ensures expansion of the unstable domain in a time less than that necessary to collapse the domain.

In one illustrative embodiment of the invention, a generator including a magnetically soft layer operative to move a seed domain, if present, about its periphery, is associated with a hairpin-shaped conductor operative to cut a stripped-out seed domain into two when pulsed. In accordance with an aspect of this invention, the geometry of a generator of this type is modified so that the seed domain is not retained at the generator. In operation, a first pulse to produce a field relatively higher in amplitude than the nucleation threshold is applied to the conductor. This pulse is of a polarity to strip out a domain inside the conductor loop and is applied for a period insufficient to nucleate a domain of minimum stable size (viz: a domain of collapse diameter with a depth equal to the layer thickness). The first pulse is followed by a second pulse of lower amplitude for generating a field in excess of the propagation level at the nucleation site for moving a domain wall to the opposite surface of the layer there before domain collapse occurs.

The magnetically soft layer (of the generator) assists the nucleation in the above embodiment and may be omitted or improved in geometry for this purpose for higher or lower amplitude drive pulses, respectively.

DETAILED DESCRIPTION

Figure 1:
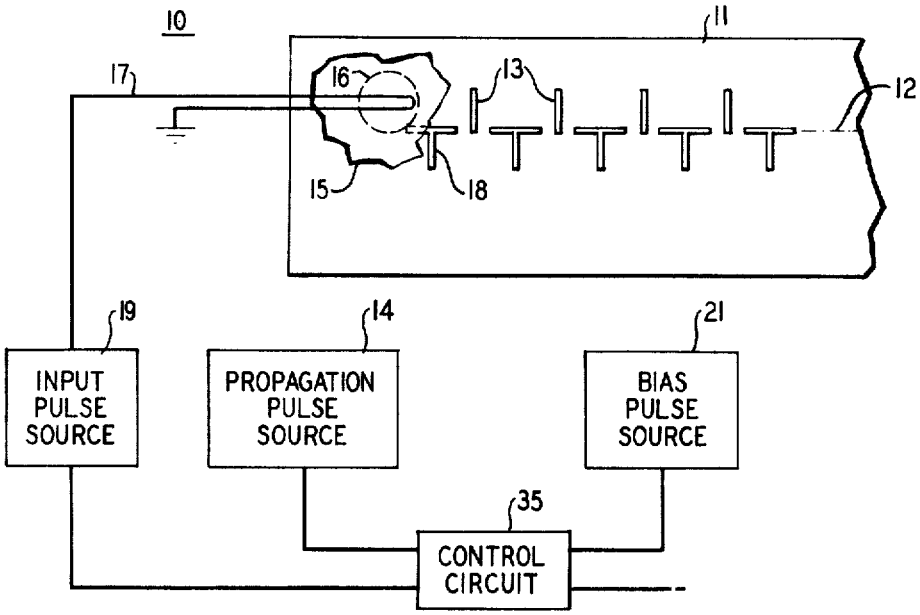
FIG. 1 is aa schematic representation of a generator arrangement in accordance with this invention.
Figure 2:
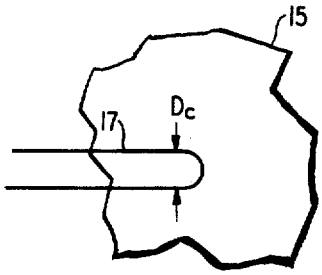
FIGS. 2 and 3 are top and cross-section views of portions of the arrangement of FIG. 1.

FIG. 1 shows a single wall domain generator arrangement 10 in accordance with this invention. The arrangement comprises a layer of material 11 in which single wall domains can be moved. A domain propagation path 12 is defined in layer 11 by the familiar bar and T-shaped magnetically soft elements 13 coupled to layer 11. The elements are responsive to a magnetic field, rotating in the plane of layer 11, which is supplied by a suitable source represented by block 14 in FIG. 1.

A generator region 15 is shown to the left of path 12 in FIG. 1. The region includes a magnetically soft dot 16 and a hairpin electrical conductor 17. Dot 16 is closely spaced with respect to first element 18, of the path-defining elements 13, to ensure that any domain at the periphery of dot 16 is removed from that periphery during each cycle of the in-plane field. It may be noted that this close spacing is contrary to the prior art teaching of domain generators of this type.

Conductor 17 is connected between an input pulse source, respectively by block 19 in FIG. 1, and ground.

The separation between the legs of the hairpin conductor is greater than the collapse diameter $D_C$ of a domain in layer 11. The collapse diameter of a domain is a well-known parameter. Typically, a domain is maintained at an operating diameter by a bias field from a source represented by block 21 of FIG. 1. The operating diameter is in the middle of a range of diameters over which a domain is stable in any given material. The limits of that range are defined by the collapse diameter corresponding to the highest bias value for which a domain exists and the strip-out diameter corresponding to the lowest value.

Figure 3:
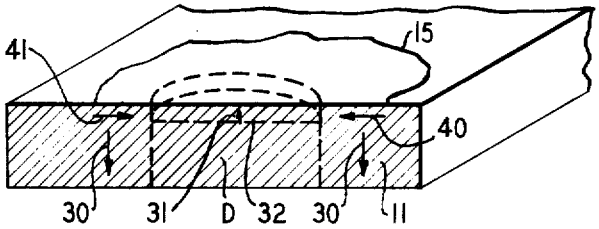

The bias is of a polarity to constrict a domain. With reference to the cross-sectional view of region 15 as shown in FIG. 3, we see that layer 11 has a magnetization downward as indicated by arrows 30. The bias field, then, is parallel to this magnetization and a domain has its magnetization upward as indicated by arrow 31 in FIG. 3.

Figure 4:
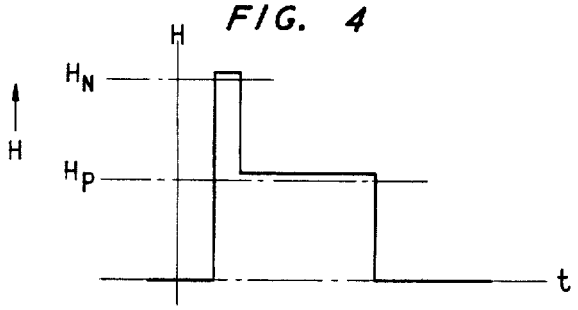
FIG. 4 is a pulse form for the operation of the portions of FIGS. 2 and 3.

FIG. 3 also shows a dotted line 32 close to the top surface of layer 11 in region 15. It has been discovered that a field in excess of the nucleation threshold of the layer and of short duration generates a surface inversion of the magnetization on which a field of much lower amplitude is operative to expand to the opposite surface. A waveform operative in this manner is depicted in FIG. 4. The FIG. (4) shows a prespike in excess of the nucleation threshold $H_N$ of layer 11 followed by a pulse in excess of the propagation threshold $H_P$ of layer 11. The prespike is of a duration insufficient to nucleate a domain of minimum stable size in layer 11. Input pulse source 19 of FIG. 1 is operative on conductor 17 to impress currents therein to generate such fields, as shown in FIG. 4, under the control of a control circuit represented by block 35 of FIG. 1.

Alternatively, dot 16 may be employed to provide the lower amplitude portion of the waveform in FIG. 4 in response to the rotating in-plane field which, in this instance, is synchronized in direction (viz: to the right in FIG. 1) by control circuit 35 when the prespike of FIG. 4 is generated. Dot 16 in FIG. 1 is shown as a broken circle to indicate that the element 16 is present or not depending on which mode of operation (or embodiment) is employed.

Regardless of the mode, a magnetic field normal to the plane of layer 11 is generated locally at the generator and in a direction antiparallel with the magnetization of layer 11. In general, that first field has a value in excess of the nucleation threshold of layer 11 at a surface sublayer and a duration insufficient to nucleate a minimum size domain. The first field is followed by a second field in excess of the propagation threshold and of a duration to expand the surface domain resulting from the first field in a direction normal to the plane of domain propagation in the arrangements shown to form a stable domain D of FIG. 3.

The second field is of an amplitude sufficiently in excess of the propagation threshold to avoid collapse of the nucleated unstable domain. There are a number of forces tending to collapse the unstable domain as indicated by arrows 40 and 41 of FIG. 3. These forces are related to the field $H_W$ of the curved wall (viz: the cylindrical wall encompassing the domain) and the bias field $H_B$ determining a value for the propagation (second) field of $$H_P > H_B + H_W$$

Also, the field $H'_W$ of the wall dividing the surface inversion from the body of the layer tends to collapse an unstable domain in a time equal to $D/2V_W$, where $V_W$ is Walker's limiting speed (see Rado and Suhl "Magnetism," III Academic Press, 1963, an article by J. F. Dillon, page 415 et seq.) and D is the domain diameter. The second field, thus, is applied for a time of $h/\mu[H_P - H_B - H_W]$ (where $\mu$ is the domain mobility) to ensure formation of a domain of minimum size and can be specified both as to amplitude and duration for achieving a minimum size domain.

The geometry and/or the amplitude of the prespike are chosen to reduce the chance of collapse of the unstable domain. If a hairpin-shaped conductor is employed, the separation between the legs of the conductor conveniently is chosen larger than the collapse diameter of a domain in order to permit the surface area of the unstable domain to be reduced somewhat without reduction below that determined by the collapse diameter. If a single leg conductor is employed, it is pulsed (with a relatively large pulse) to generate a (first) field exceeding the nucleation threshold over a surface area greater than that determined by the collapse diameter.

As has been mentioned hereinbefore, the pulse form of FIG. 4 need not be supplied solely by a pulsed conductor. Fields generated by the current pulse and oriented in the plane of layer 11 assist the initial reversal and so are operative to lower the power required to generate the first field. The rational for this is based on the well-known Stoner-Wohlfarth theory (see Philosophical Transactions of the Royal Society, A, 1948, Vol. 240, page 599). Such in-plane fields are also conveniently supplied by a magnetically soft element (viz: 13 of FIG. 1) in which currents are generated. The element is set by the in-plane field synchronously to produce vertical fields also.

Figure 5:
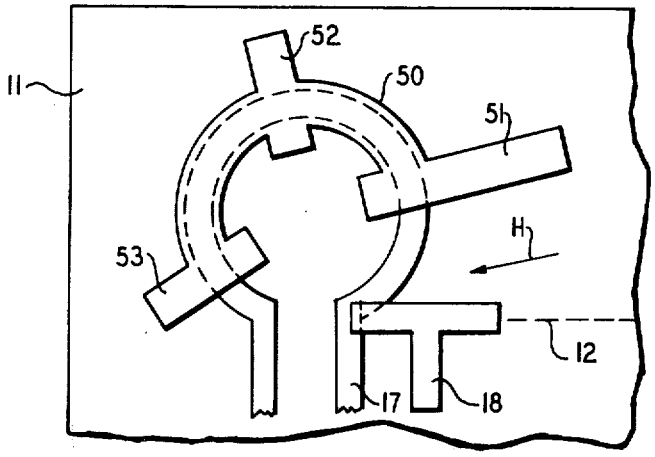
FIG. 5 is a schematic representation of an alternative domain generator in accordance with this invention.

FIG. 5 shows an alternative generator arrangement where magnetically soft material is present to assist not only in the provision of the nucleation field but also in the provision of the propagation field. The designations employed in this embodiment correspond to those employed in the embodiment of FIG. 1 to expedite comparison. Here, as in FIG. 1, a hairpin-shaped conductor 17 is formed on the surface of layer 11 with a closely spaced, path-defining element 18 (here overlying conductor 17). In this instance, an additional magnetically soft element 50 also overlies conductor 17. Element 50 includes bar-shaped portions 51, 52, and 53. Portions 51, 52, and 53 extend within the area encompassed by conductor 17 and can be appreciated to be poled by a nucleation pulse in the conductor to assist in providing the nucleate field.

In addition, the one of those portions the long dimension of which is aligned with the in-plane field when the rotating (in-plane) field is generated, also generates a field to assist propagation of wall 32 of FIG. 3 through layer 11. For a field directed as indicated by arrow H in FIG. 5, portion 51 is aligned with the field to assist propagation. The portions 51, 52, and 53 are misaligned with one another to avoid cancellation of this assisting field for any given in-plane field orientation.

Element 18 of FIG. 5 can be seen to be disposed to withdraw from the area encompassed by conductor 17 any domain generated there for propagation along channel 12 in response to continued rotations of the in-plane field.

Single wall domain (bubble) generators of the type described herein not only obviate the problem of seed bubble loss and overcome failures due to loss of power, but also lend themselves to a variety of other uses. For example, the presence of a bubble in a position adjacent the generator position inhibits bubble generation. This leads to a logical inversion function.

Figure 6:
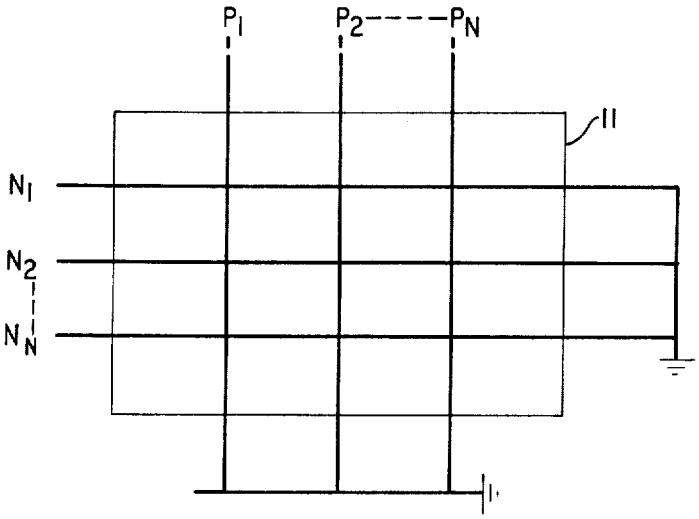
FIG. 6 is a line diagram of an input arrangement for a random access memory employing the arrangement of FIG. 1.

The mechanism of the generator also leads to an attractive input arrangement for a random access bit or word organized bubble memory. FIG. 6 shows one such organization. A matrix of X and Y conductors N1, N2, – Nn, and P1, P2, and Pn define bit locations at their intersections. The prespike of FIG. 4 is generated by a pulse applied selectively to conductors M1, M2, and Mn by pulse means not shown. The lower amplitude pulse of FIG. 4 is generated by a pulse applied selectively to conductors P1, P2, –Pn also by pulse means not shown. Only in those bit locations where the two fields are generated synchronously are domains provided.

In other locations coupled by the selected conductors, whether or not domains are present from previous operation, only negligible perturbations occur. For example, the nucleation field is of insufficient duration to nucleate a domain in locations coupled to it in the absence of the second field regardless of the amplitude of the pulse. Similarly, the second field is incapable of nucleating a domain alone as long as its amplitude is below the nucleation threshold. Therefore, appreciable margins are afforded for such a write operation.

The following example of a generator in accordance with one aspect of this invention emphasizes the advantages realized: An epitaxial film of $Y_1Gd_1Tm_1Ga_{0.8}Fe_{4.2}O_{12}$ grown on a nonmagnetic crystal of Gadolinium Gallium Garnet having a magnetization ($4\pi Ms$) of 220 Gauss and an anisotropy of 1,518 oersteds (a "q" of 6.9) exhibited bubbles having an operating diameter of 6.0 microns in a bias field of 104 oersteds. Bubble collapse occurred at a bias field of 115 oersteds and the collapse diameter was 3.0 microns. The film thickness was 5.8 microns. A hairpin-shaped electrical conductor having a width of 6 microns, a leg spacing of 4 microns and a thickness of 4,000 A was pulsed with 340 milliamperes delivering a field of 390 oersteds for a duration of 10 nanoseconds. That pulse was followed by a second pulse of 80 milliamperes delivering a field of 92 oersteds for a duration of 25 nanoseconds. The nucleation and propagation thresholds for the material were 340 milliamperes and 80 milliamperes, respectively. In the absence of either of the first or the second field, no domain was nucleated. The difference between the 400 oersteds supplied and the 1,518 oersteds which is the anisotropy field is made up by the internal demagnetized fields (220 oersteds) and the in-plane field (of about 390 oersteds) which add according to the Stoner-Wohlfarth theory accounting for the generated 400 oersted field exceeding the nucleation threshold. Normally, this configuration would be expected to require three times as much current and nine times as much power in order to switch a minimum size domain.

What has been described is considered merely illustrative of the principles of this invention. Therefore, various modifications can be devised by those skilled in the art in accordance with those principles within the spirit and scope of this invention.

What is claimed is:

1. Apparatus comprising a layer of material characterized by a propagation and a nucleation threshold and a preferred direction of magnetization out of the plane of said layer, said layer being capable of having therein a single wall domain of minimum stable size having a surface area and a collapse diameter, and nucleation means for nucleating single wall domains in said layer, said nucleation means including a first electrical conductor coupled to said layer at a first position and means for selectively applying to said conductor a first pulse to generate a first magnetic field of an amplitude in excess of said nucleation threshold over a surface area in excess of that of said minimum size for a time sufficient to nucleate only an unstable domain of less than said minimum size at said first position.

2. Apparatus in accordance with claim 1 wherein said means for generating said first field also includes one element of magnetically soft material coupled to said layer and having a geometry to exhibit poles therein to provide a field parallel to said first field in response to said first pulse.

3. Apparatus in accordance with claim 1 wherein said nucleation means also includes means for generating a second magnetic field at said first position said second field being of a magnitude less than said nucleation threshold and in excess of said propagation threshold and having duration to expand said unstable domain to said minimum size.

4. Apparatus in accordance with claim 3 wherein said means for generating said second field comprises said first electrical conductor and means for pulsing said conductor in a manner to generate said second field.

5. Apparatus in accordance with claim 4 wherein said first conductor has a hairpin geometry with first and second legs where the separation between said legs is greater than said collapse diameter.

6. Apparatus in accordance with claim 3 wherein said means for generating said second field also includes an element of magnetically soft material of a geometry and so disposed to generate said second field in response to a magnetic field in the plane of said layer.

7. Apparatus in accordance with claim 6 also including a pattern of elements of magnetically soft material operative responsive to said in-plane field reorienting in the plane of said layer to move domains so generated along a path in said layer.

8. Apparatus in accordance with claim 3 wherein said means for generating said second magnetic field comprises a second electrical conductor coupled to said layer and disposed transverse to said first conductor.

9. Apparatus in accordance with claim 8 comprising a plurality of said second conductors disposed transverse to said first electrical conductor, said second conductors being responsive to selective pulses for generating said second field at selected positions along said first conductor.

10. Apparatus in accordance with claim 9 also including a plurality of said first conductors intersecting said second conductors said first means being adapted for selectively pulsing said first conductors and said second means being adapted for selectively pulsing said second conductors for selectively nucleating domains at intersections therebetween.

11. Apparatus comprising a layer of material capable of exhibiting single wall domains having a minimum stable size, said material being characterized by a preferred direction of magnetization out of the plane of said layer and a nucleation threshold for domains, and means for nucleating said domains in said layer, said last-mentioned means including means for generating at a first position in said layer a field which exceeds said nucleation threshold only at a surface sublayer of said layer for a time insufficient to nucleate a domain of said minimum stable size.

*12. A device for generating magnetic bubbles in a wafer of a magnetic material, said device comprising:*

*a plurality of elements of a highly permeable magnetic material overlayed on the wafer of a magnetic material and outwardly extending from a localized region of the wafer in which magnetic bubbles are to be generated, the elements operating in response to an*

*applied rotating magnetic field to provide a first magnetic field in the localized region of the wafer,*

*the magnitude of this first magnetic field being insufficient to induce a reversal of the direction of the magnetization in the wafer, and*

*a current line overlayed on the wafer and positioned so that a portion of the current line forms a loop-like segment around said localized region of the wafer, for providing a second magnetic field in said localized region of the wafer whenever a current is pulsed through the current line,*

*the combined magnitudes of the first and second magnetic fields being sufficient to induce a reversal of the direction of the magnetization in said localized region of the wafer.*

*13. A device as in claim 12 wherein each of said plurality of elements comprises a rectangular strip.*

*14. A method for nucleating magnetic bubbles in a wafer of a magnetic material, said method comprising the steps of:*

*applying a first magnetic field to a localized region of the magnetic wafer, the magnitude of this first magnetic field being insufficiently large to induce a reversal of the direction of the magnetization in the wafer, and*

*applying a second magnetic field to the localized region of the wafer, the combined magnitude of the first and second magnetic fields being sufficiently large to induce a reversal of the direction of the magnetization in this localized region of the magnetic wafer.*

*15. A method for nucleating magnetic bubbles as in claim 14 wherein the step of applying a first magnetic field comprises the step of applying a rotating magnetic field to an arrangement of permeable elements, the permeable elements in turn producing a first magnetic field by generating fringing magnetic fields near the ends of the elements.*

*16. A method for nucleating magnetic bubbles as in claim 14 wherein the step of applying a second magnetic field comprises the step of pulsing a current through a current line, thereby producing the second magnetic field.*

* * * * *